(12) United States Patent
Hoyt et al.

(10) Patent No.: US 9,666,022 B2
(45) Date of Patent: May 30, 2017

(54) OVERLAPPING ANTENNA ARRAYS FOR GAMING

(71) Applicant: Magnet Consulting, Inc., Incline Village, NV (US)

(72) Inventors: Joshua K Hoyt, Portland, OR (US); Forrest S Seitz, Beaverton, OR (US)

(73) Assignee: Magnet Consulting, Inc., Incline Village, NV (US)

( * ) Notice: Subject to any disclaimer, the term of this patent is extended or adjusted under 35 U.S.C. 154(b) by 377 days.

(21) Appl. No.: 14/541,739

(22) Filed: Nov. 14, 2014

(65) Prior Publication Data

US 2015/0141126 A1    May 21, 2015

Related U.S. Application Data

(60) Provisional application No. 61/904,981, filed on Nov. 15, 2013.

(51) Int. Cl.
*G07F 17/32* (2006.01)
*G06K 19/07* (2006.01)
*G08B 13/24* (2006.01)

(52) U.S. Cl.
CPC ....... *G07F 17/322* (2013.01); *G06K 19/0723* (2013.01); *G08B 13/2402* (2013.01)

(58) Field of Classification Search
CPC ......... G06K 19/0723; G06K 19/07773; G06K 7/10217; G06K 7/10316; G06K 7/10326; G06K 7/10336; G06K 7/10346; G06K 7/10356; G08B 13/2402; G08B 13/2448; G08B 13/2468; G08B 13/2474; H01Q 1/22; G07F 17/322; G07F 17/32
See application file for complete search history.

(56) References Cited

U.S. PATENT DOCUMENTS

| | | | | |
|---|---|---|---|---|
| 7,561,053 B2* | 7/2009 | Hecht | ................... | G07F 17/322 340/572.1 |
| 7,719,424 B2* | 5/2010 | Steil | .......................... | A63F 1/06 235/376 |
| 7,753,779 B2* | 7/2010 | Shayesteh | ............... | G07F 17/32 340/572.1 |
| 7,883,408 B2* | 2/2011 | Gelinotte | ............. | G06K 7/0008 463/25 |
| 7,938,722 B2* | 5/2011 | Rowe | .................... | A44C 21/00 463/25 |
| 8,092,293 B2* | 1/2012 | Richards | ................. | G07F 17/32 463/17 |
| 8,187,075 B2* | 5/2012 | Koyama | .................. | G07F 17/32 340/572.7 |
| 8,221,227 B2* | 7/2012 | Koyama | ................. | G07F 17/32 340/13.26 |
| 8,277,310 B2* | 10/2012 | Koyama | ................. | G07F 17/32 463/25 |
| 8,303,404 B2* | 11/2012 | Kirsch | ..................... | A63F 1/18 463/12 |

(Continued)

*Primary Examiner* — Brian Miller
(74) *Attorney, Agent, or Firm* — Fountainhead Law Group P.C.

(57) ABSTRACT

A system and method of locating gaming tokens on a gaming table. Two sets of overlapping antennas are arranged in intersecting directions. The system uses the data from intersecting antennas to determine the positions of the gaming tokens. Having overlapping antennas reduces dead spots.

19 Claims, 11 Drawing Sheets

(56) References Cited

U.S. PATENT DOCUMENTS

| | | | |
|---|---|---|---|
| 8,395,507 B2* | 3/2013 | Hoyt | G06K 19/047 340/572.1 |
| 8,395,525 B2* | 3/2013 | Hoyt | G06K 19/0701 340/10.2 |
| 8,425,312 B1* | 4/2013 | Kirsch | A63F 1/18 463/12 |
| 8,432,283 B2* | 4/2013 | Hoyt | H04Q 9/00 235/492 |
| 8,690,678 B2* | 4/2014 | Thorson | G07F 17/32 340/572.1 |
| 8,777,730 B2* | 7/2014 | Koyama | G07F 17/32 463/25 |
| 8,810,371 B2* | 8/2014 | Murdoch | G06K 7/10346 340/10.1 |
| 8,981,940 B2* | 3/2015 | Hoyt | G06K 19/07749 340/572.1 |
| 9,536,388 B2* | 1/2017 | Panambur | G07F 17/3248 |
| 2009/0054130 A1* | 2/2009 | Gelinotte | A63F 1/00 463/25 |
| 2009/0221364 A1 | 9/2009 | Richard et al. | |
| 2010/0176924 A1 | 7/2010 | Seitz et al. | |

* cited by examiner

OVERLAPPING ANTENNA ARRAYS FOR GAMING

CROSS REFERENCE TO RELATED APPLICATIONS

This application claims the benefit of U.S. Provisional App. No. 61/904,981 for "Overlapping Antenna Arrays for Gaming" filed Nov. 15, 2013.

BACKGROUND

The present invention relates to gaming, and in particular, to locating gaming chips on a gaming table.

Unless otherwise indicated herein, the approaches described in this section are not prior art to the claims in this application and are not admitted to be prior art by inclusion in this section.

In a casino gaming environment, there is a need for efficiency, accuracy and auditing. Efficiency relates to the speed of the game, which contributes to player engagement as well as increases the rate of return on the game. Accuracy relates to the correctness of intakes and payouts, which contributes to player satisfaction as well as conforms the rate of return to historical expectations. Auditing relates to the ability of management to review the efficiency and accuracy.

Traditionally, casinos have relied on training to meet their goals for efficiency, accuracy and auditing. Well-trained dealers are more efficient and accurate. Well-trained pit bosses are more easily able to view, review and audit the activities of the dealers and players.

More recently, radio frequency identification (RFID) technology is being deployed in casinos. Gaming tokens include RFID tags, and gaming tables include RFID readers. The particular location of a gaming token on a gaming table is often important; however, this is a challenge for RFID technology. One solution is to define specific betting spots on a gaming table, associate an RFID antenna with each betting spot, and then engineer the system such that each RFID antenna only detects the RFID tokens located in its betting spot. Various techniques may be used to engineer the system; these include providing physical space between adjacent betting spots, providing electromagnetic shielding (e.g., ground loops) around antennas, generating cancellation fields, etc.

FIG. 1 is a top view of a stylized Baccarat table 100. The table 100 includes 12 seated player positions, each having a player betting spot (individually numbered 120a-120l) and a dealer betting spot (individually numbered 130a-130l). Within a betting spot (e.g., 120a or 130a), the seated player may place one or more gaming tokens (a bet), and one or more bettors may each place one or more gaming tokens (additional "back bets"). The table also includes betting spots 140a and 140b for placing bets on a tie. Generally, each bet associated with an entity (either the seated player or the back bettor) is placed as a discrete stack for easy identification by the gaming personnel. Thus, a betting spot may have multiple stacks of gaming tokens (with a single gaming token being considered a "stack" for purposes of this discussion).

FIG. 2 is a top view of a stylized roulette table 200. The table 200 includes a wheel (not shown) and numerous betting spots (shown as boxes in the grid 220). A betting spot indicates a specific number (e.g., 1, 2, 3, etc.) or various groupings (e.g., red, black, odd, even, etc.) that the wheel may indicate. For a particular betting spot (e.g., 220a), a bet may be placed within the betting spot (a "straight" bet, indicating a bet only on that spot), on the line between two spots (a "split" bet, indicating the bet is on both of those two spots), or at the intersection of two lines (a "corner" bet, indicating the bet is on all four of the spots surrounding the intersection). Other types of bets may be indicated by other placements of gaming tokens, such as a "street" bet (three numbers in a line), a "line" or "double street" bet (two adjacent lines each having three numbers), a "top line" (five number) bet (0, 00, 1, 2, 3), etc. The game has multiple players, and each player may place multiple bets. For ease of identification, roulette players use gaming tokens having different colors. Thus, a betting spot (or intersection between spots) may have one or more stacks of gaming tokens, each stack having one or more colors.

SUMMARY

As RFID systems have been deployed in gaming environments, various issues have been observed. One issue is that some gaming tables (e.g., roulette) have discrete betting areas that are close together. One solution would be to use closely-spaced antennas to read the closely-spaced betting areas. However, there is a limit to how closely the antennas may be spaced, in order for a particular antenna not to detect the tokens in an adjacent betting spot. This results in various "blind spots" on the gaming table in which tokens may not be detected.

Another issue is that some gaming tables have a betting area in which multiple players may place gaming tokens. For example, a Baccarat hand occurs between a "banker" and a "player", with seated players able to place bets on the banker, the player, or a tie. Non-seated players ("back bettors") may also place bets for the player, the banker or a tie using the same betting spots; thus, gaming tokens may be placed at many potential locations on a table. One solution to tracking these bets would be to subdivide the "player", "banker", and "tie" betting spots into defined subspots each having its own antenna. However, on a typical table layout, these subspots will still have spacing and blind spot issues. In addition, the need to place bets within defined subspots may detract from player enjoyment by requiring tokens to be placed more precisely as compared to a traditional gaming table layout without defined subspots.

In response to the above-noted shortcomings, an embodiment provides an array of overlapping, intersecting antennas in a betting spot. The specific location of a gaming token within the betting spot may be determined by the intersection of two or more antennas. Since the antennas are overlapping, there are no blind spots. The intersecting antennas allow gaming tokens to be identified at multiple locations within the betting spot (including identifying multiple gaming tokens in a stack at a single location as a single, discrete bet). In this manner, the system is able to detect that there are multiple, discrete groupings of tokens (each at a different location) within a betting spot, as would be the case when multiple players place bets there. The ability to define the location of individual bets is also helpful when it comes time to collect losing bets and payout winning bets. To accurately associate a specific payout with a specific winning bet is useful and knowing the spatial coordinates of winning bets is part of a working solution. In addition, the system increases the efficiency, accuracy and auditing of the gaming environment by providing automated tracking, counting and recordkeeping to augment the gaming personnel.

According to an embodiment, a system locates gaming tokens on a gaming table. The system includes a first set of antennas oriented in a first direction, a second set of antennas oriented in a second direction that differs from the first direction, and a control circuit coupled to the first and second sets. The first set of antennas defines a betting area of the gaming table. The first set includes a first subset of antennas and a second subset of antennas. The first subset and the second subset are overlapping, as well as the first set and the second set are overlapping. The second set includes a third subset of antennas and a fourth subset of antennas. The third subset and the fourth subset are overlapping. The control circuit is configured to selectively energize the first and second sets, is configured to receive a first plurality of signal strengths resulting from reading an RFID gaming token in the betting area according to the first set being selectively energized, and is configured to receive a second plurality of signal strengths resulting from reading the RFID gaming token in the betting area according to the second set being selectively energized. The control circuit is configured to determine a location of the RFID gaming token in the betting area by comparing the first plurality of signal strengths and the second plurality of signal strengths.

According to an embodiment, a system locates gaming tokens on a gaming table. The system includes a first set of antennas oriented in a first direction, and a control circuit coupled to the first set. The first set of antennas defines a betting area of the gaming table. The first set includes a first subset of antennas and a second subset of antennas. The first subset and the second subset are overlapping. The control circuit is configured to selectively energize the first and second subsets, is configured to receive a first signal strength resulting from reading an RFID gaming token in the betting area according to the first subset being selectively energized, and is configured to receive a second signal strength resulting from reading the RFID gaming token in the betting area according to the second subset being selectively energized. The control circuit is configured to determine a location of the RFID gaming token in the betting area by interpolating between the first signal strength and the second signal strength.

According to an embodiment, a system locates gaming tokens on a gaming table. The system includes a first set of antennas oriented in a first direction, a second set of antennas oriented in a second direction that differs from the first direction, and a control circuit coupled to the first and second sets. The first set of antennas defines a betting area of the gaming table. The first set includes a first subset of antennas and a second subset of antennas. The first subset and the second subset are overlapping, as well as the first set and the second set are overlapping. The control circuit is configured to selectively energize the first and second sets, to receive a first plurality of signal strengths resulting from reading an RFID gaming token in the betting area according to the first set being selectively energized, and is configured to receive a second plurality of signal strengths resulting from reading the RFID gaming token in the betting area according to the second set being selectively energized. The control circuit is configured to determine a location of the RFID gaming token in the betting area by comparing the first plurality of signal strengths and the second plurality of signal strengths.

According to an embodiment, a method may locate gaming tokens on a gaming table. The method may be executed by a computer system that controls the energizing of the antennas and the determination of the location of the RFID gaming token, in a manner similar to that described above.

An embodiment is noteworthy because it easily accommodates back bettors. The primary argument to accommodating back bettors is simple: casino income is based on statistics and volume. Back bettors increase the volume of bets on a given game. However, back bettors contribute to a certain amount of chaos. The technology described in this document is designed to help manage that chaos.

The following detailed description and accompanying drawings provide a further understanding of the nature and advantages of embodiments of the present invention.

DETAILED DESCRIPTION

Described herein are techniques for locating gaming tokens. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

As discussed above, FIG. 1 is a top view of a stylized Baccarat table 100. As further detailed below, the table 100 includes overlapping, intersecting antennas in each betting spot to determine the discrete location of each bet.

As discussed above, FIG. 2 is a top view of a stylized roulette table 200. As further detailed below, the table 200 includes overlapping, intersecting antennas under the grid 220 to determine the discrete location of each bet.

Besides roulette there are other casino games that allow back bettors and other multi-player bets in a betting area. These games include many of the table games such as 3-card poker, blackjack, Pai Gow poker, double-hand poker, etc.

Figure 2:
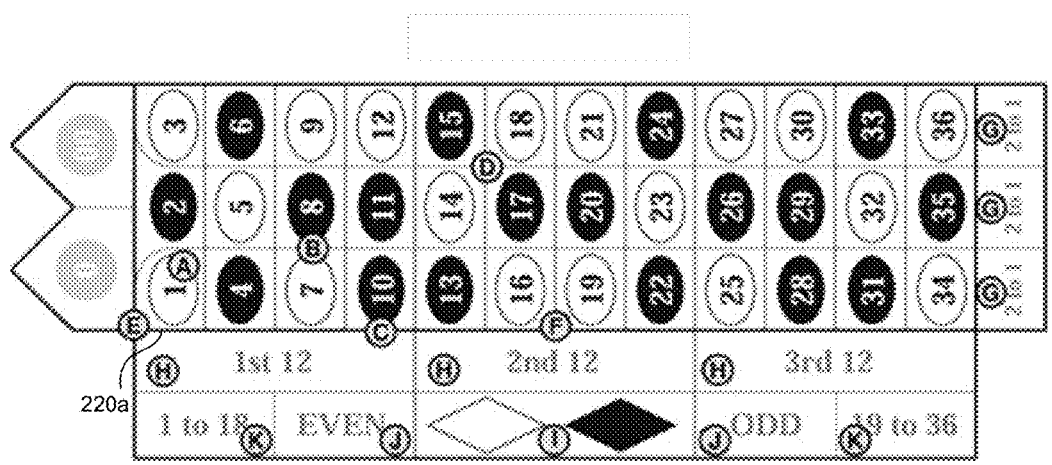
FIG. 2 is a top view of a stylized roulette table.
Figure 3:
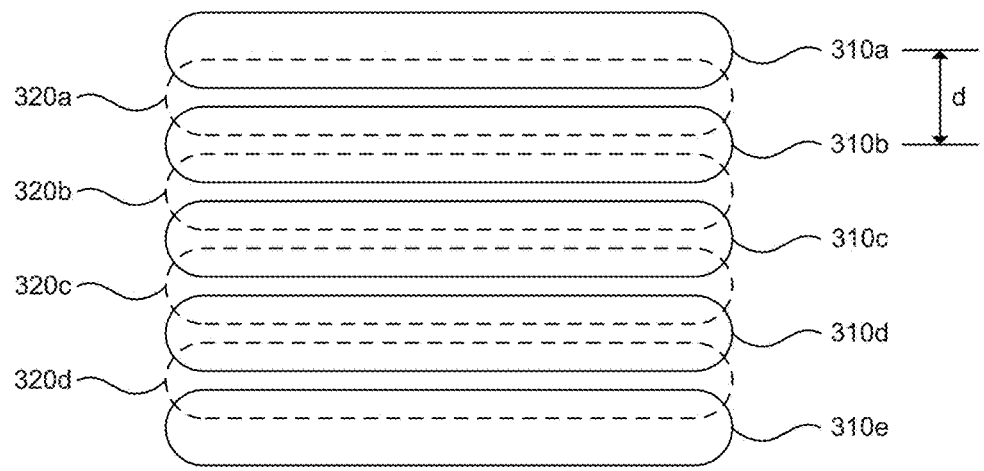
FIG. 3 is a top view of overlapping antennas that are oriented in one direction (e.g., east-west as shown).

FIG. 3 is a top view of overlapping antennas 300 that are oriented in one direction (e.g., east-west as shown). The antennas 300 are generally rectangular with rounded ends. The antennas 300 are arranged as a top set 310 (individually 310a-310e) and a bottom set 320 (individually 320a-320d). The top set 310 overlaps the bottom set 320, which eliminates dead spots (as discussed below). The distance "d" denotes the distance between centerlines of adjacent antennas. According to an embodiment, "d" is 1.78 inches. The number, size and shape of the antennas 300 may vary based on design requirements, as further discussed below. The sets 310 and 320 may be formed on a multi-layer printed circuit board. Alternatively, each set may be formed on its own circuit board, and the circuit boards for the sets 310 and 320 are placed one atop the other underneath the betting spot (or larger betting area such as the grid 220 of FIG. 2) on the gaming table. The spacing of the overlapping antennas can be tailored to the spatial accuracy needed to identify the location of specific bets. For large or irregularly-shaped betting areas, multiple circuit boards or circuit boards with different sizes and shapes may be used.

Figure 4:
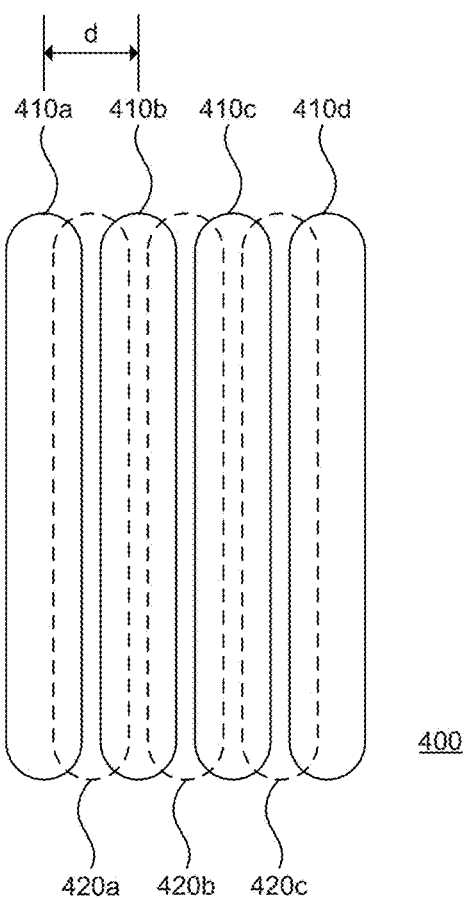
FIG. 4 is a top view of overlapping antennas that are oriented in another direction (e.g., north-south as shown) that differs from the direction of the antennas of FIG. 3.

FIG. 4 is a top view of overlapping antennas 400 that are oriented in another direction (e.g., north-south as shown) that differs from the direction of the antennas 300 (see FIG. 3). The antennas 400 are arranged as a top set 410 (individually 410a-410e) and a bottom set 420 (individually 420a-420d). The top set 410 overlaps the bottom set 420, which eliminates dead spots. The distance "d" denotes the distance between centerlines of adjacent antennas. The antennas 400 are otherwise similar to the antennas 300 (see FIG. 3).

Figure 5:
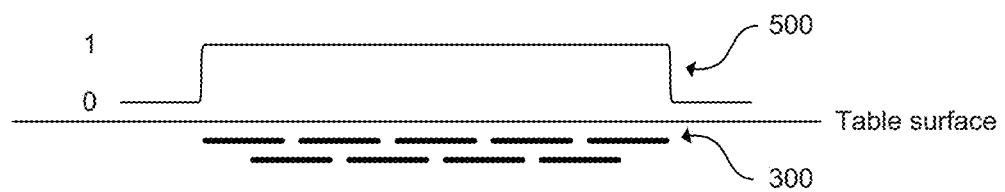
FIG. 5 is a cross-sectional view of a stylized electromagnetic field generated by the antennas of FIG. 3.

FIG. 5 is a cross-sectional view of a stylized electromagnetic field 500 generated by the antennas 300 (see FIG. 3). The line of the field 500 is drawn to show the nominal detection range above the antennas 300. The field 500 is generally continuous above the antennas 300 and has no dead spots.

A similar field exists regarding the antennas 400 (see FIG. 4).

Figure 6:
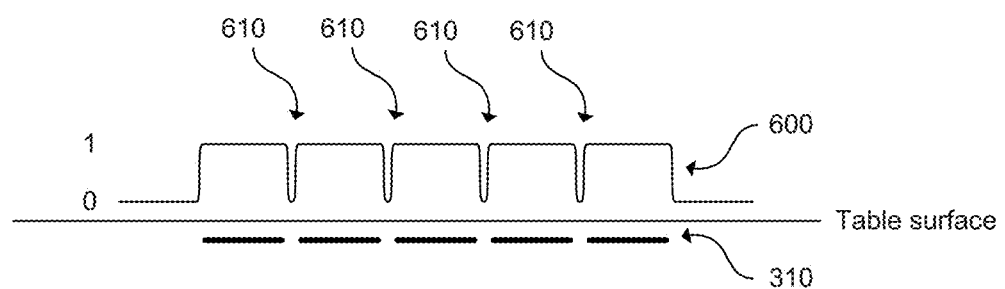
FIG. 6 is a cross sectional view of stylized electromagnetic fields.

FIG. 6 is a cross sectional view of stylized electromagnetic fields 600. The fields 600 are generated by antennas that are not overlapping, such as if the top set 310 (see FIG. 3) were present without the bottom set 320. The lines of the fields 600 are drawn to show the nominal detection range of each of the antennas 310. Dead spots 610 between the fields 600 result from lacking overlapping antennas. Thus, to avoid dead spots (e.g., as in FIG. 5), it is desired to use overlapping antennas (e.g., the antennas 300 of FIG. 3) instead of non-overlapping antennas.

A similar field would exist if the bottom set 420 (see FIG. 4) were present without the top set 410.

Figure 7:
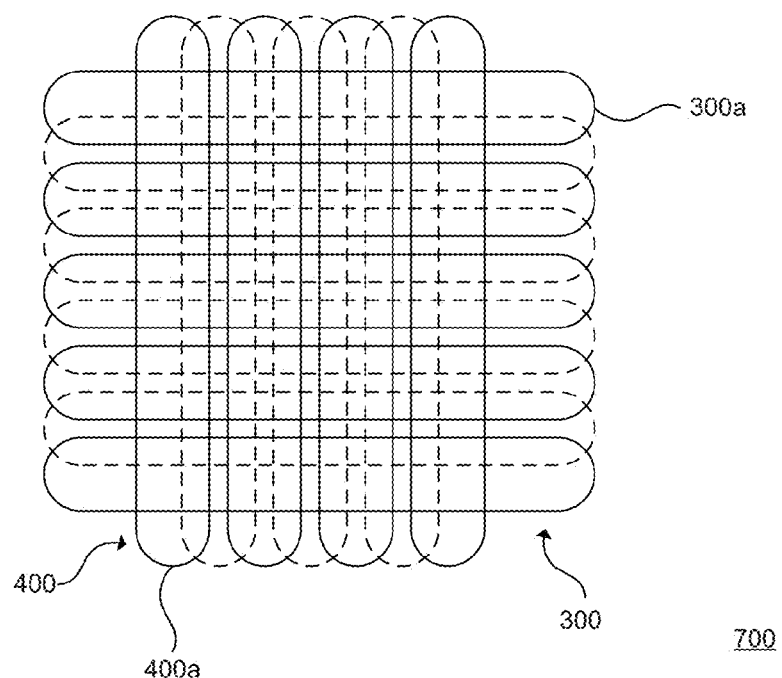
FIG. 7 is a top view of intersecting, overlapping antennas.
Figure 8:
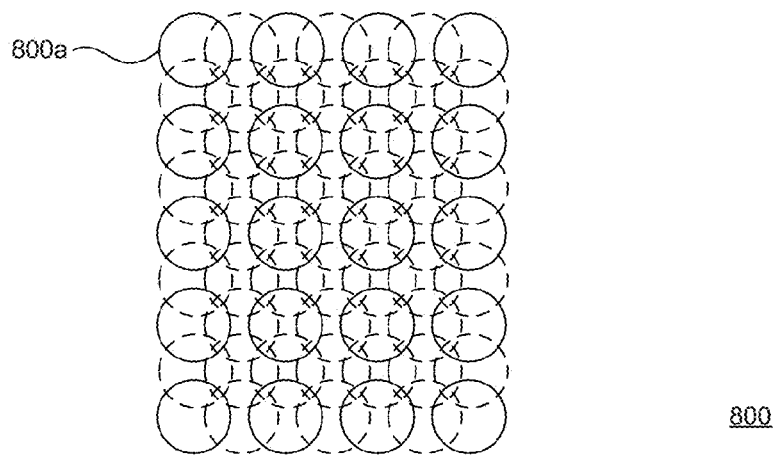
FIG. 8 is a top view showing the detectable locations of the intersecting, overlapping antennas of FIG. 7.

FIG. 7 is a top view of intersecting, overlapping antennas 700. For example, the intersecting, overlapping antennas 700 may be formed by overlapping the east-west antennas 300 (see FIG. 3) and the north-south antennas 400 (see FIG. 4). Each area of intersection between one antenna from 300 and one antenna from 400 defines a discrete location in which gaming tokens may be detected, as shown in FIG. 8. The antennas 700 (sets 310 and 320 in FIG. 3, sets 410 and 420 in FIG. 4) may be formed on a multi-layer printed circuit board. Alternatively, the sets may be formed on more than one circuit board that are overlapped (e.g., 310 and 320 on one circuit board, overlapping 410 and 420 on another circuit board). The intersecting, overlapping antennas may also be referred to as an array (e.g., the array 700).

FIG. 8 is a top view showing the detectable locations 800 of the intersecting, overlapping antennas 700 (see FIG. 7). Each of the locations 800 occurs above the intersection of one of the east-west antennas 300 (see FIG. 7) and one of the north-south antennas 400 (see FIG. 7). For illustrative purposes, the locations above intersecting antennas that are both shown as solid in FIG. 7 are shown with solid lines in FIG. 8 (20 locations); the locations above all the other intersections (solid and dotted, or both dotted) are shown with dotted lines (43 locations). Since the antennas 300 and 400 (see FIG. 7) are overlapping, the locations 800 cover the entirety of the betting area, resulting in no dead spots.

As an example, gaming tokens are discriminated at the location 800a by detecting the tokens using the antenna 300a and the antenna 400a (see FIG. 7). First, the system energizes one of the antennas 300 (e.g., 300a). This results in detecting the tokens in the field above the antenna 300a. However, note that their specific location is not yet known; at this time the only information is that the tokens may be anywhere within the detection field of the antenna 300a. In other words, this first data set determines only one of the two coordinates used to locate a point in a plane. Next, the system energizes one of the antennas 400 (e.g., 400a) to determine the second coordinate. This results in detecting the tokens in the field above the antenna 400a. Since the antennas 300a and 400a intersect, the location of the tokens is determined to be the location 800a that corresponds to the intersection area.

Figure 9:
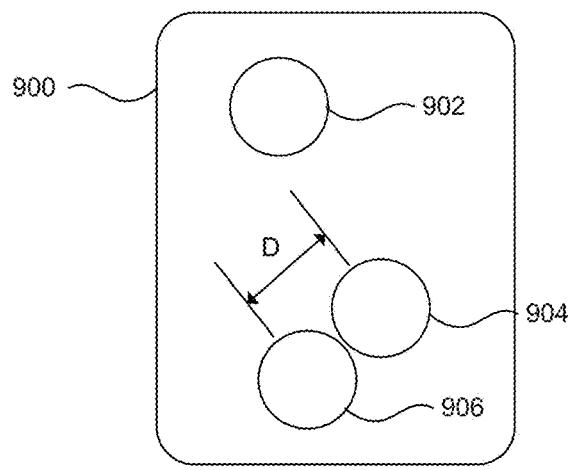
FIG. 9 is a top view of a betting area.

FIG. 9 is a top view of a betting area 900. The betting area 900 includes a number of gaming tokens (or stacks of gaming tokens) 902, 904 and 906. The distance "D" denotes the distance between centers of adjacent stacks. Thus, for a system with the distance "d" of FIG. 3 and FIG. 4, the system is able to detect multiple stacks of tokens as separate and distinct stacks as long and they are separated by the distance "D" that is greater than "d". So given the token diameter, the distance "d" of the antennas may be adjusted in order to provide the desired level of discrimination among the potential locations.

Figure 10:
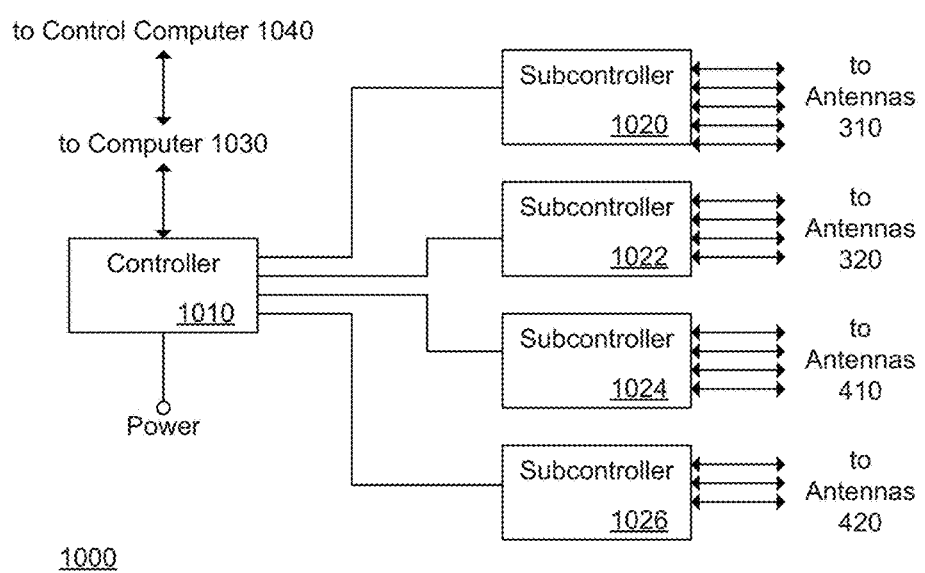
FIG. 10 is a block diagram of a system for controlling an antenna array such as the intersecting, overlapping antennas of FIG. 7.

FIG. 10 is a block diagram of a system 1000 for controlling an antenna array such as the intersecting, overlapping antennas 700 (see FIG. 7). The system 1000 includes a controller 1010 and subcontrollers 1020, 1022, 1024 and 1026. The system 1000 may connect to a computer 1030 that executes a control program for controlling the system 1000. The connection may be via a universal serial bus (USB) connection. The computer 1030 may connect to a central control computer 1040 that stores, for example, a chip database. The connection may be via a local area network (e.g., Ethernet).

The controller 1010 provides power to the subcontrollers 1020, 1022, 1024 and 1026. The controller 1010 coordinates the operation of the subcontrollers 1020, 1022, 1024 and 1026, by selectively instructing the subcontrollers to activate, receiving token identification data (including signal strength information) from the subcontrollers, and sending the token identification data to the computer.

The subcontrollers 1020, 1022, 1024 and 1026 respectively connect to the antenna sets 300 and 400 (see FIG. 7; includes the sets 310 and 320 in FIG. 3 and the sets 410 and 420 in FIG. 4). A subcontroller (e.g., 1020) selectively energizes the antennas in the corresponding antenna set (e.g., 310), receives the token identification data from the corresponding antenna set, and sends the token identification data to the controller 1010.

The computer 1030 may instruct the system 1000 to operate according to a variety of detection options, as more fully discussed below. The computer 1030 may control multiple systems 1000, for example as implemented on a single gaming table or on multiple gaming tables. The computer may be one of multiple computers (e.g., each controlling one or more system 1000) that connect to the central control computer 1040.

Figure 11:
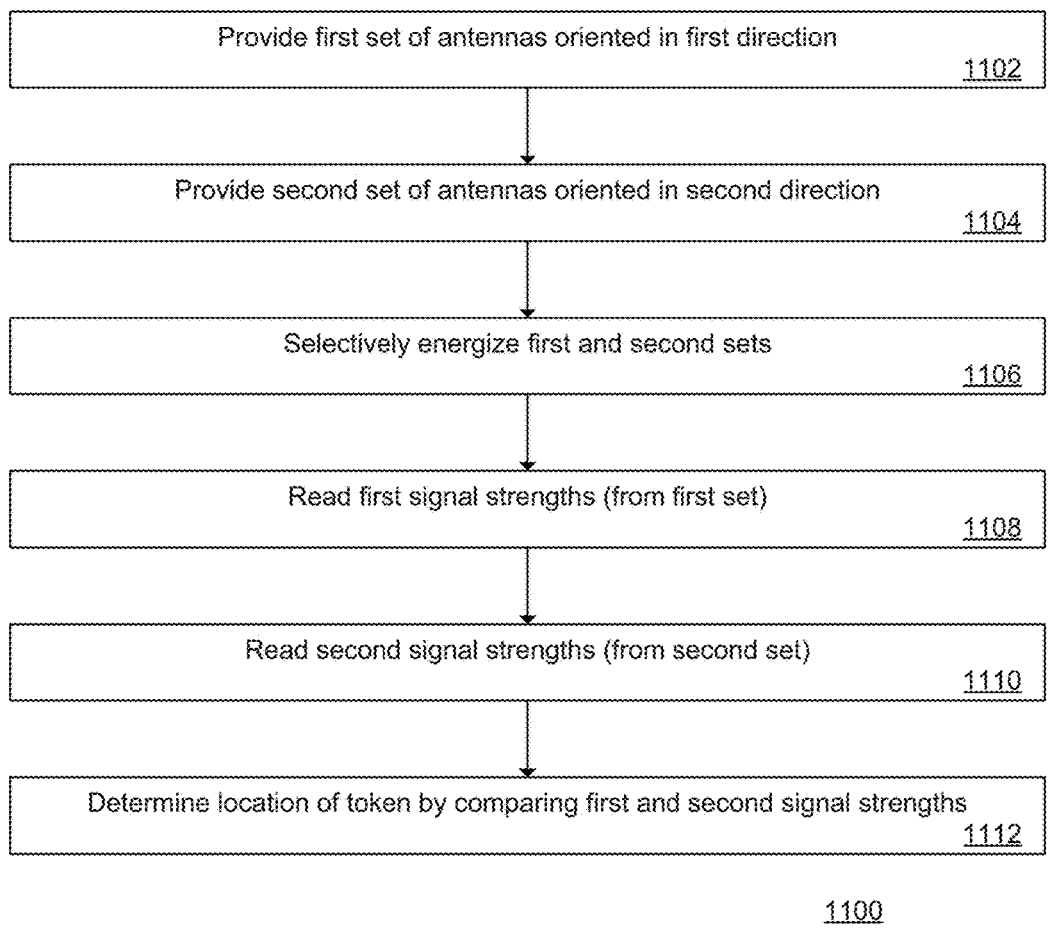
FIG. 11 is a flowchart of a method of locating gaming tokens on a gaming table.

FIG. 11 is a flowchart of a method 1100 of locating gaming tokens on a gaming table. The method may be performed by the system 1000 (see FIG. 10) or the computer that controls the system 1000, for example as controlled by a computer program.

At 1102, a first set of antennas oriented in a first direction are provided. For example, the antennas 300 (see FIG. 3) may be provided. The first set of antennas defines a betting area of the gaming table. The first set includes a first subset of antennas and a second subset of antennas, where the first subset and the second subset are overlapping. For example, the antennas 300 (see FIG. 3) include a set 310 and a set 320 that overlap.

At 1104, a second set of antennas oriented in a second direction are provided. The second direction differs from the first direction. For example, the antennas 400 (see FIG. 4) are oriented in a north-south direction, which differs from the east-west orientation of the antennas 300 (see FIG. 3). The first set and the second set are overlapping. For example, the antennas 300 and the antennas 400 (see FIG. 7) are overlapping. The second set includes a third subset of antennas and a fourth subset of antennas, where the third subset and the fourth subset are overlapping. For example, the antennas 400 (see FIG. 4) include a set 410 and a set 420 that overlap.

At 1106, the first and second sets are selectively energized. For example, the controller 1010 (see FIG. 10) may instruct the subcontrollers 1020, 1022, 1024 and 1026 to selectively energize the antennas 300 and 400. Further details on the various ways in which the antennas may be selectively energized are provided below.

At 1108, a first plurality of signal strengths is received, resulting from reading a radio frequency identification (RFID) gaming token in the betting area according to the first set being selectively energized. For example, the controller 1010 may receive the token identification data from the subcontrollers 1020 and 1022, resulting from reading the gaming tokens detected by the antennas 300. The signal strengths may also be received as binary data, e.g., one symbol (e.g., the value 1) when an antenna detects the token, and another symbol (e.g., the value 0) when an antenna does not detect the token.

At 1110, a second plurality of signal strengths is received, resulting from reading the RFID gaming token in the betting area according to the second set being selectively energized. For example, the controller 1010 may receive the token identification data from the subcontrollers 1024 and 1026, resulting from reading the gaming tokens detected by the antennas 400.

At 1112, a location of the RFID gaming token in the betting area is determined by comparing the first plurality of signal strengths and the second plurality of signal strengths. For example, the computer (see FIG. 10) may select the highest signal strength detected by the antennas 300 (which is associated with the antenna 310*a*), may select the highest signal strength detected by the antennas 400 (which is associated with the antenna 410*a*), and may determine that the gaming token is located in the area defined by the intersection of the antenna 310*a* and the antenna 410*a*. When the signal strengths are binary data as discussed above, the intersection of the two antennas that return the value 1 corresponds to the location of the gaming token. When the signal strengths are within the range of a maximum signal strength and a minimum signal strength, the location of the gaming token may be determined using interpolation, as described below.

Additional Details and Design Options

The following sections discuss additional details and design options.

Token Detection Options

With the overlapping, intersecting antennas, a gaming token in the betting area will be detected by at least two intersecting antennas (e.g., detected by 310*a* and 410*a* in FIG. 7, indicating location 800*a* in FIG. 8). However, since the antennas oriented in a particular direction (e.g., the antennas 300 in FIG. 3) are overlapping, there is the possibility that more than one of these antennas will detect the token, albeit with differing signal strengths due to the different distances between the token and the antennas. (If a particular antenna fails to detect the token, the system may assign a signal strength measurement of zero to that antenna.) The system may implement a number of ways in which to correlate the received signal strengths and the positions on the gaming table.

One way is to use the highest signal strength detected. For example, energizing the antennas results in the signal strength measurements of TABLE 1:

TABLE 1

| Antenna | Signal Strength |
|---|---|
| 310a | 1.0 |
| 320a | 0.5 |
| 310b-310e, 320b-320d | 0 |
| 410a | 1.0 |
| 420a | 0.5 |
| 410b-410d, 420b-420c | 0 |

Of the antennas in the set 300, the antenna 310*a* has the highest signal strength; similarly antenna 410*a* of the set 400. Thus, the system determines that the token is located at the intersection of the antennas 310*a* and 410*a*.

Another way is to interpolate between the various signal strengths. For example, energizing the antennas results in the signal strength measurements of TABLE 2:

TABLE 2

| Antenna | Signal Strength |
| --- | --- |
| 310a | 0.5 |
| 320a | 0.5 |
| 310b-310e, 320b-320d | 0 |
| 410a | 0.5 |
| 420a | 0.5 |
| 410b-410d, 420b-420c | 0 |

To determine the location, the system determines the position by interpolating among the signal strengths of each set. For the set 300, the total signal strength is 1.0 (0.5+0.5); the total is half associated with the antenna 310a (0.5/1.0) and half associated with the antenna 320a (0.5/1.0), so the north-south position is interpolated as halfway between 310a and 320a. For the set 400, the total signal strength is 1.0 (0.5+0.5); the total is half associated with the antenna 410a (0.5/1.0) and half associated with the antenna 420a (0.5/1.0), so the east-west position is interpolated as halfway between 410a and 420a. The overall position is then the intersection of the north-south position and the east-west position.

Multiple Location Detection Options

As mentioned above, the system is able to determine the positions of multiple bets within the betting spot, to determine that a stack of tokens in a single location are associated as a single bet, and to determine that multiple stacks correspond to multiple bets at multiple positions within the betting spot. In general, a stack may be around 20 tokens high (a convenient height to manipulate with one hand), so the power supplied to the antennas may be adjusted to sufficiently read that distance. Alternatively, the power supplied may start at a minimal level and then ramp up in order to read tokens at successively greater distances. As discussed below, each token has an identifier that is read when the antenna detects the token, allowing for signal strength measurements to be associated with each token.

When there are multiple single tokens each at a different location, the system detects the position of each as it selectively energizes the antennas. For example, when the antenna 310a (see FIG. 3) is energized, it detects two tokens with identifiers ID0001 and ID0002, both having signal strengths 1.0. When the antenna 410a (see FIG. 4) is energized, it detects token ID0001 with signal strength 1.0, and when the antenna 410b is energized, it detects token ID0002 with signal strength 1.0. (Assume the remaining antennas do not detect any tokens.) Thus, the position of token ID0001 is determined as the intersection of antennas 310a and 410a, and the position of token ID0002 is determined as the intersection of antennas 310a and 410b.

When there are multiple tokens in a single stack, the system detects the position of each as it selectively energizes the antennas. For example, when the antenna 310a (see FIG. 3) is energized, it detects two tokens with identifiers ID0001 and ID0002, both having signal strengths 1.0. When the antenna 410a (see FIG. 4) is energized, it detects tokens ID0001 and ID0002, both having signal strengths 1.0. (Assume the remaining antennas do not detect any tokens.) Thus, tokens ID0001 and ID0002 are determined to be a stack, with the position of the stack determined as the intersection of antennas 310a and 410a.

When there are multiple stacks or a combination of one or more stacks and one or more single tokens, the system detects the position of each as it selectively energizes the antennas. For example, when the antenna 310a (see FIG. 3) is energized, it detects two tokens with identifiers ID0001 and ID0002, both having signal strengths 1.0. When the antenna 310b is energized, it detects token ID0003 with signal strength 1.0. When the antenna 410a is energized, it detects all three tokens ID0001, ID0002 and ID0003 with signal strength 1.0 each. (Assume the remaining antennas do not detect any tokens.) Thus, tokens ID0001 and ID0002 are determined to be a stack at the position of the intersection of antennas 310a and 410a, and the token ID0003 is determined at the position of the intersection of antennas 310b and 410a.

Minimum Threshold Signal

The system may be configured to recognize a minimum threshold signal. For example, if the signal strength of 0.5 results when tokens are halfway above the antenna, a minimum threshold signal level of 0.1 may be set. The system ignores signal strength measurements below the minimum, as those measurements may result from a particular antenna reading tokens that are more strongly read by another antenna. This helps the system to use enough antenna power to detect a token at the top of the stack, yet ignore a token at the bottom of an adjacent stack.

Interpolation Options

Figure 12A:
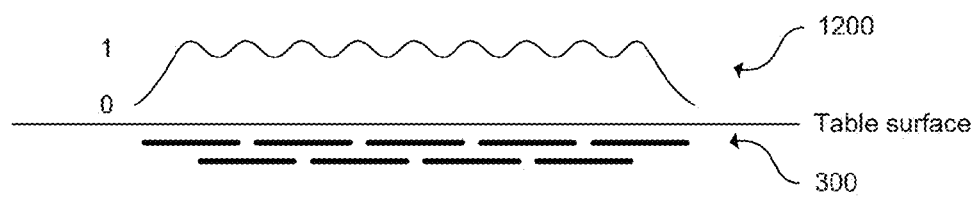
FIG. 12A is a cross-sectional view of a stylized electromagnetic field generated by the antennas of FIG. 3.

FIG. 12A is a cross-sectional view of a stylized electromagnetic field 1200 generated by the antennas 300 (see FIG. 3). The field 1200 is similar to the field 500 (see FIG. 5), except the field 1200 is shown a bit less stylized: the field 1200 is strongest above the center of each of the antennas 300, and decreases toward the edge of each antenna. As a result, the strength of the field 1200 has a wave or ripple shape as shown.

Figure 12B:
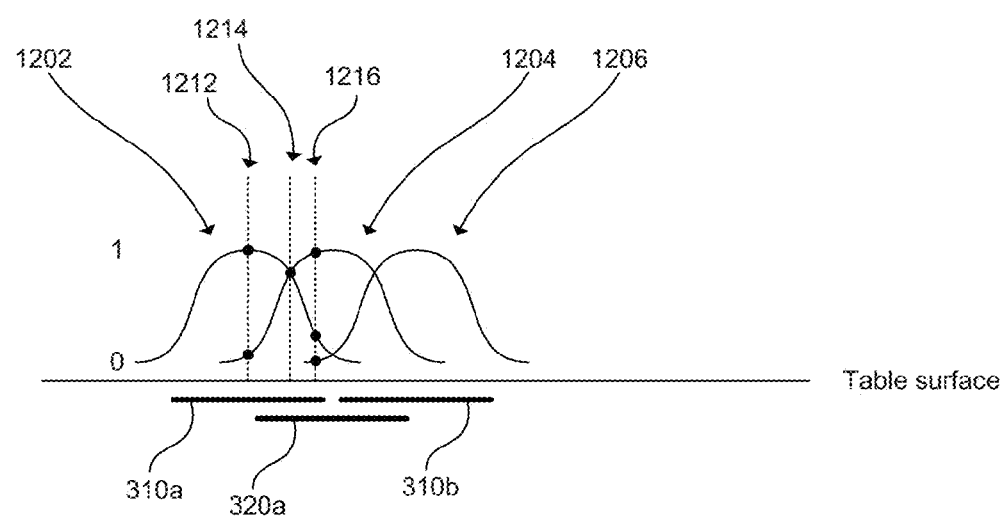
FIG. 12B is a cross-sectional view of the stylized subfields that make up a portion of the field of FIG. 12A.

FIG. 12B is a cross-sectional view of the stylized subfields that make up a portion of the field 1200 (see also FIG. 12A). The subfield 1202 is generated by the antenna 310a (see FIG. 3), the subfield 1204 is generated by the antenna 320a, and the subfield 1206 is generated by the antenna 310b. (When combined, the subfields 1202, 1204 and 1206 result in a portion of the field 1200, with its ripple shape).

FIG. 12B illustrates more details concerning how the location of tokens may be interpolated. Consider tokens ID0001, ID0002 and ID0003 placed at respective locations 1212, 1214 and 1216. The antennas detect these tokens with the strengths listed in TABLE 3 (where tokens not detected, or detected at strengths below a set threshold, are considered to be zero and not listed):

TABLE 3

| Token Identifier | Antenna | Strength |
| --- | --- | --- |
| ID0001 | 310a | 1.0 |
| ID0001 | 320a | 0.1 |
| ID0002 | 310a | 0.8 |
| ID0002 | 320a | 0.8 |
| ID0003 | 320a | 0.95 |
| ID0003 | 310a | 0.2 |
| ID0003 | 310b | 0.05 |

A variety of processes may be implemented to translate the signal strength information into location information. One example is to use a linear ratio, applied to TABLE 3 as follows. For token ID0001, the highest signal strength corresponds to antenna 310a, so the starting position is the center of antenna 310a. The signal for the token ID0001 is also detected by antenna 320a, so the position of the token is offset by a ratio $$0.1/(1.0+0.1)=0.091=9.1\%$$

That is, the ultimate position is determined by an offset of 9.1% from the center of the antenna 310*a* toward the center of the antenna 320*a*. The offset may also be referred to as the fractional distance.

For token ID00002, the offset is $$0.8/(0.8+0.8)=0.5=50\%$$

That is, the position of ID0002 is offset 50% from the center of the antenna 310*a* toward the center of the antenna 320*a*.

For token ID0003, the offset is $$0.2/(0.95+0.2)=0.174=17.4\%$$

That is, the position of ID0003 is offset 17.4% from the center of the antenna 320*a* toward the center of the antenna 310*a*. Note that the lowest signal strength measurement of 0.05 may be discarded.

The interpolation may be implemented by the system 1000 (see FIG. 10) as part of energizing the antennas and receiving the signal strength measurements. The controller 1010 may perform the interpolation, or the computer 1030 may perform the interpolation.

Antenna Arrangement Options

The size, shape and arrangement of the overlapping, intersecting antennas (e.g., FIG. 7) may be adjusted as desired. In general, the game type, table size and size of betting areas will be the primary design factors. Additional design factors include variations on the game type, local laws, casino rules, casino branding and graphics, etc.

The antenna array of FIG. 7 may be combined with other antennas that are not overlapping. The non-overlapping antennas may be used to read tokens in a specific, designated area.

Another way to determine the position of tokens is to use polar coordinates instead of the x-y grid of FIG. 7. To measure the distance from a center point, a first set of antennas are each arranged in overlapping, concentric rings. A second set of antennas is overlapping with the first set, and is arranged in another configuration that creates intersections between the two sets. For example, the rectangular, rounded antennas of FIG. 3 or FIG. 4 may be used as the second set. The second set may be divided into non-overlapping subsets in order to detect the appropriate quadrant. For example, using the east-west rounded antennas of FIG. 3, one subset may cover the northeast and southeast quadrants, and the other subset may cover the northwest and southwest quadrants.

The shape of the antennas may be adjusted from the rectangular, rounded antennas of FIG. 3 or FIG. 4. For example, the antennas may be wedge shaped or pie shaped. The intersection between sets may differ from the right-angle intersection shown in FIG. 7. For example, the intersection between a wedge shaped antenna and a rectangular antenna is not necessarily a right-angle intersection.

Antenna Arrangements for Gameplay

The intersecting, overlapping antennas (e.g., FIG. 7) may also be used in situations where a single antenna would ordinarily suffice. Consider a gaming table that has individual betting spots that are reserved for specific types of bets. Each betting spot may be monitored using a single, dedicated antenna. For example, a blackjack table has defined spots for betting a "split" or a "double down" when those bets are available according to the gameplay.

The array of intersecting, overlapping antennas (e.g., FIG. 7) may be used in place of the one or more antennas dedicated to monitoring the individual betting spots. The array allows discrete stacks of bets to be tracked. In addition, the array is more forgiving of sloppy token placement, as the array itself may be larger than the individual betting spots.

Layout Examples

Figure 1:
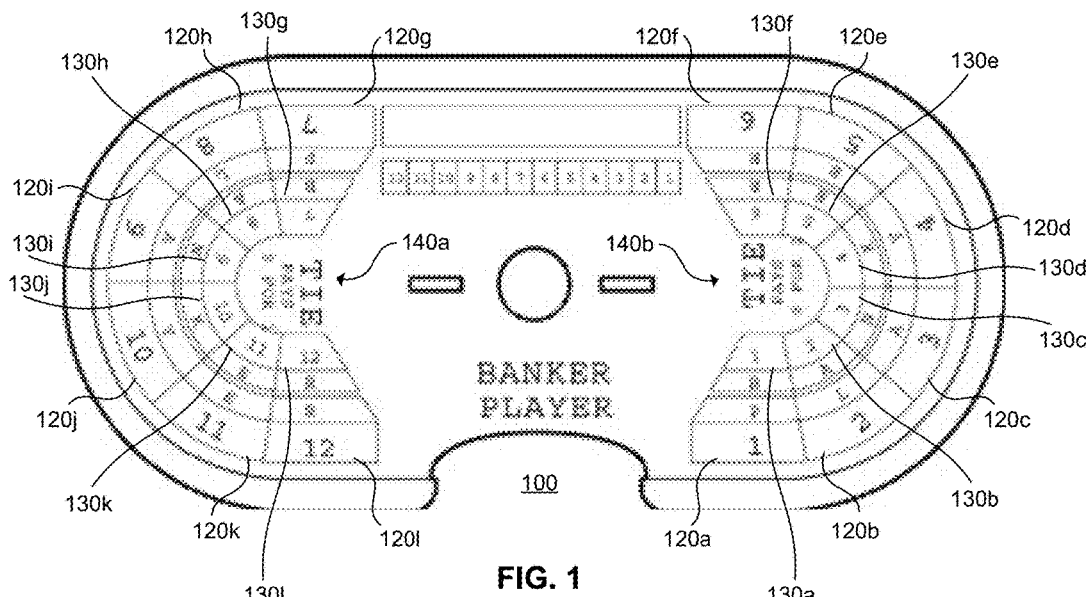
FIG. 1 is a top view of a stylized Baccarat table.
Figure 13:
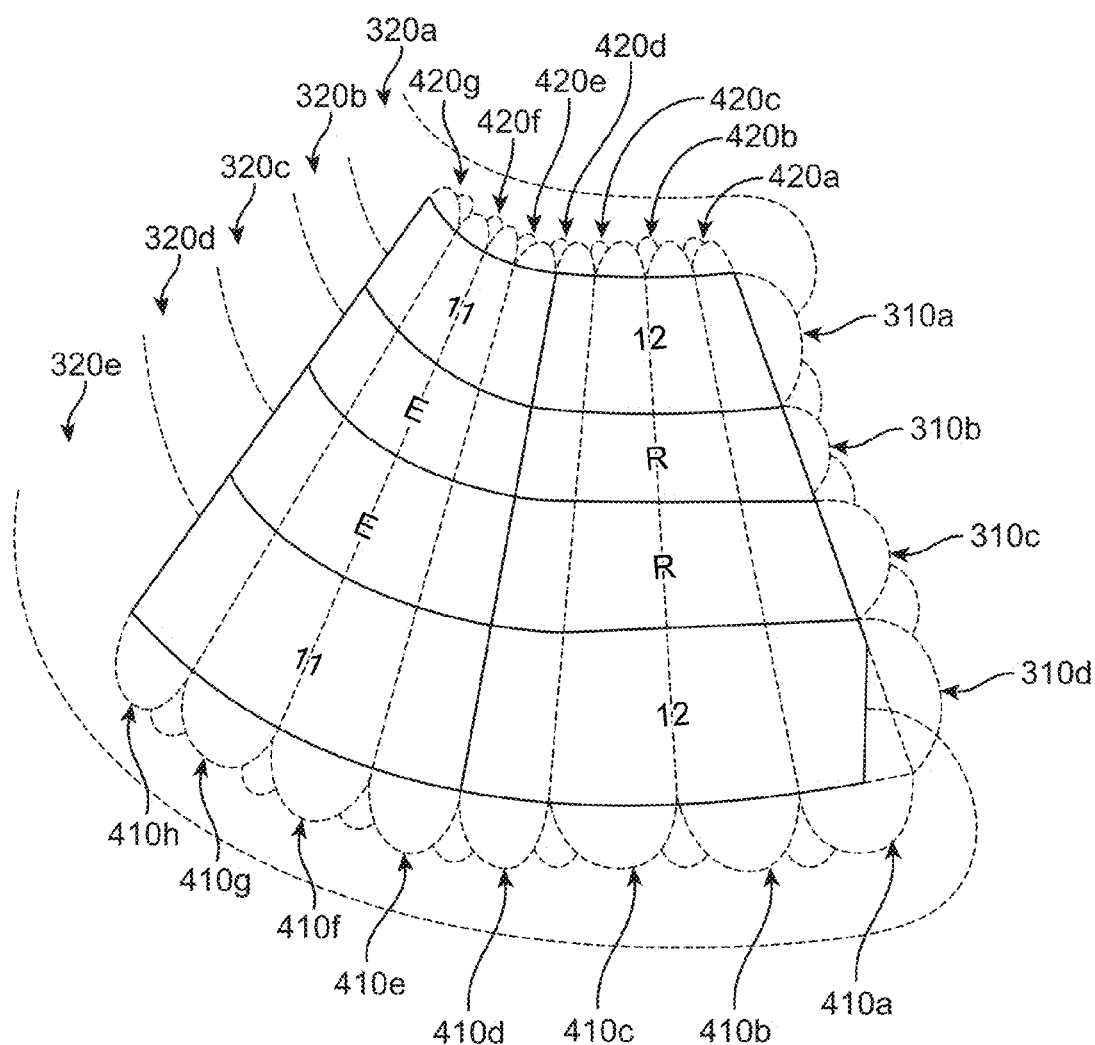
FIG. 13 is a stylized top view of a portion of the Baccarat table of FIG. 1, with the addition of overlapping, intersecting antennas.

FIG. 13 shows a stylized top view of a portion of the Baccarat table of FIG. 1, with the addition of overlapping, intersecting antennas. The antennas include a first set of east-west antennas 310*a*, 310*b*, 310*c* and 310*d* (cf. FIG. 3; collectively 310); a second set of east-west antennas 320*a*, 320*b*, 320*c*, 320*d* and 320*e* (collectively 320); a first set of north-south antennas 410*a*, 410*b*, 410*c*, 410*d*, 410*e*, 410*f*, 410*g* and 410*h* (cf. FIG. 4; collectively 410); and a second set of north-south antennas 420*a*, 420*b*, 420*c* 420*d*, 420*e*, 420*f* and 420*g* (collectively 420). The antenna sets 310 and 320 are overlapping, and the antenna sets 410 and 420 are overlapping. Due to the shapes of the betting areas, the shapes of the antenna sets 310, 320, 410 and 420 are not uniform, in contrast to the antennas 700 of FIG. 7; still, the antennas 310 and 320 may be described as being in one direction (east-west), and the antennas 410 and 420 may be described as being in another direction (north-south). The east-west antenna sets 310 and 320 intersect the north-south antenna sets 410 and 420. Note that the intersection between two antennas (e.g., 410*h* and 320*a*) may be an offset intersection (e.g., offset from ninety degrees), instead of the right-angle intersection of FIG. 7.

For a full Baccarat table, the antenna arrangement of FIG. 13 may be duplicated for a total of six overlapping, intersecting antenna portions. Each of the antenna portions may be controlled by a system 1000 (see FIG. 10), with the six circuits 1000 for the full Baccarat table connecting to a computer 1030.

Figure 14:
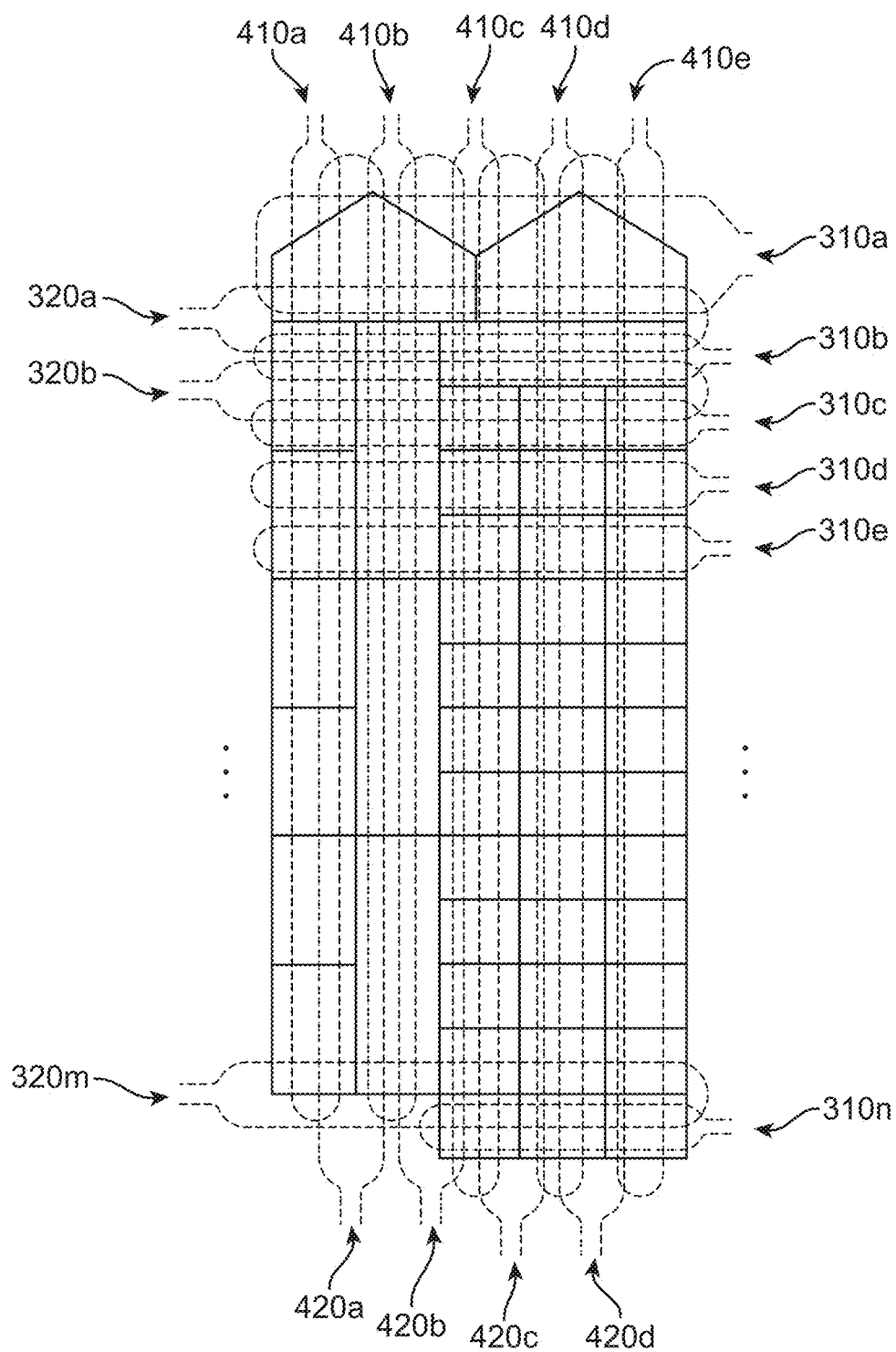
FIG. 14 is a stylized top view of the roulette table of FIG. 2, with the addition of overlapping, intersecting antennas.

FIG. 14 shows a stylized top view of the roulette table of FIG. 2, with the addition of overlapping, intersecting antennas. The antennas include a first set of fourteen east-west antennas 310*a*, 310*b*, 310*c*, 310*d*, 310*e*, 310*f*-310*m* (not shown) and 310*n* (collectively 310); a second set of thirteen east-west antennas 320*a*, 320*b*, 320*c*-3201 (not shown) and 320*m* (collectively 320); a first set of north-south antennas 410*a*, 410*b*, 410*c*, 410*d* and 410*e* (collectively 410); and a second set of north-south antennas 420*a*, 420*b*, 420*c* and 420*d*. The antenna sets 310 and 320 are overlapping, and the antenna sets 410 and 420 are overlapping. The east-west antenna sets 310 and 320 intersect the north-south antenna sets 410 and 420.

The antennas for the roulette table of FIG. 14 generally form a grid that corresponds to the betting spots on the table. The antenna set 410 corresponds to the center of each column, and the antenna set 420 corresponds to the line between each column. The antenna set 310 corresponds to the center of each row, and the antenna set 320 corresponds to the line between each row. The intersection between sets enables the system to determine the location of all the bets on the table. The antennas of FIG. 14 may be controlled by the system 1000 (see FIG. 10), connecting to a computer 1030.

Antenna Sequencing Options

The system may implement a number of ways to sequence energizing the antennas. In general, it is undesirable to energize all the antennas at once. It is undesirable to energize two adjacent antennas at once due to cross-talk. Cross-talk may also occur when energizing two adjacent antennas simultaneously. Similar cross-talk concerns may occur for overlapping or intersecting antennas.

One way to sequence the antennas is to energize one at a time in a straight sequence. In this case, the controller 1010 (see FIG. 10) coordinates the subcontrollers 1020, 1022, 1024 and 1026 to operate sequentially. An example is the following sequence: 310*a* (see FIG. 3), 310*c*, 320*a*, 320*c*, 310*e*, 310*b*, 310*d*, 320*b*, 320*d*, 410*a* (see FIG. 4), 410*c*, 420*a*, 420*c*, 410*b*, 410*d*, 420*b*. Another example is the following sequence: 310*a*, 410*a*, 310*c*, 410*c*, 320*a*, 420*a*, 320*c*, 420*c*, 310*e*, 310*b*, 410*b*, 310*d*, 410*d*, 320*b*, 420*b*, 320*d*. Note that the starting point is arbitrary.

Another way to sequence the antennas is to occasionally read two or more non-adjacent and non-intersecting antennas at a time, to reduce the time it takes to read the area. In this case, the controller 1010 coordinates the subcontrollers 1020, 1022, 1024 and 1026 to operate sequentially (similar to the previous examples), but also to perform simultaneous reads occasionally. An example is the following sequence where sometimes two antennas are read at the same time: 310*a* and 310*c*, 310*b* and 310*d*, 310*e*, 320*a* and 320*c*, 320*b* and 320*d*, 410*a* and 410*c*, 410*b* and 410*d*, 420*a* and 420*c*, 420*b*. By doing up to two reads at a time, the number of steps required to read the area is reduced from sixteen sequential reads to nine reads. Other patterns are possible to reduce the total read time.

In general, the system does not read two adjacent antennas simultaneously (because it would diminish the spatial resolution, e.g., the ability to locate the bet). According to an alternate embodiment, the system implements a "fine" array that is then turned into a "coarse" array by energizing adjacent antennas simultaneously. The rationale for doing so is to speed up the read cycle.

Another feature is to add a switch to each antenna. The switch may disconnect the antenna from the control circuit (e.g., the system 1000 in FIG. 10) and create a shorted loop. This prevents the antenna from receiving energy when another antenna is active, thereby reducing cross-talk. As an example, when one antenna is active, all other antennas are disconnected. As another example, when one antenna is active, all antennas with the same orientation are disconnected (e.g. in FIG. 3, when 310*a* is active, all other antennas in 300 are disconnected).

Read Time Options

In general, the read time for reading the entire array (e.g., the array 700 of FIG. 7) is sufficient to detect sleight-of-hand activity, e.g., 10 complete reads of the array occur every second. For normal gameplay, it is generally sufficient to perform 2 complete reads of the array every second. Note that—depending on the RFID protocol in use—the actual read time of each antenna may depend upon the token load (the number of tokens detected by the antenna). For example, the tokens will often implement an anti-collision response protocol to prevent them all from responding at the same time when energized. As a result, the read time may be decreased as the technology used to implement the tokens is adjusted to reduce the response time.

As discussed above, to speed up the read cycle for the entire array, the system may energize multiple antennas simultaneously. Energizing non-adjacent antennas will not diminish the spatial resolution of the system. Energizing adjacent antennas will diminish the spatial resolution (e.g. from "fine" to "coarse").

Matching Tokens to Bets

As mentioned above, the tokens have identifiers. In general, when a token receives the excitation field generated by an antenna, the token responds with its identifier. The computer (e.g., the computer 1030 in FIG. 10) may store a database that corresponds identifiers to token values. When the controller 1010 communicates a set of identifiers to the computer, the computer may respond with the corresponding values.

Consider the following TABLE 4 as an example of the information in a database of token identifiers and token values:

TABLE 4

| Identifier | Value |
|---|---|
| ID0000-ID0999 | $1 |
| ID1000-ID1100 | $5 |
| ID1101-ID1200 | $10 |
| ID1201-ID1300 | $25 |
| ID1301-ID1400 | $50 |
| ID1401-ID1500 | $100 |

If a bettor places a bet of $85 in a stack of three tokens, the system 1000 (see FIG. 10) detects the tokens (e.g., ID1301, ID1201 and ID1101) and sends the identifiers and the corresponding signal strengths to the computer 1030. The computer 1030 uses the signal strength information to determine the location, and since the signal strength information indicates that all three are at the same location, the computer 1030 determines that the tokens are in a stack and thus a discrete bet. The computer 1030 sends the three identifiers to the control computer 1040, which responds with the values ($50, $25 and $10). (If the control computer 1040 does not recognize a particular identifier, the control computer may respond with an error message.) The computer 1030 may then use the values to provide feedback to the dealers or players, for example by displaying the values of bets ($85) on a video monitor. Similarly, the system detects other bets and displays all the values, which increases the accuracy of payouts. The value information may also be used for auditing purposes, for example to confirm that a particular game is operating according to its expected house edge, to view the amount of action occurring at the table, to track that the appropriate house rake or time charge has been paid, etc.

As roulette tables use colored tokens specifically for roulette, not the standard tokens used by the casino, the system architecture implementing the chip database may be simplified. For example, the computer 1030 may store a chip database that contains the identifiers of all the roulette tokens. The computer 1030 may connect to one or more roulette tables. If it is desired to extend the system, the computer 1040 may be added (e.g., for access to the overall chip database, for connecting the roulette table to a broader auditing system, etc.).

Enhancing Gameplay

Once the system knows the locations and amount of bets, this enables various enhancements to the gameplay, for example to monitor and improve the accuracy and timeliness of actions. In general, the gameplay occurs in modes: bet placement mode, outcome mode, collection mode, payout mode, and postgame mode.

Initially, the system is in bet placement mode, allowing new bets to be placed and changed. At some defined point in time, bets can no longer be changed. For example, in Baccarat, bets cannot be changed after the first card is dealt. In roulette, bets cannot be changed after the ball "drops". In outcome mode, the outcome of the game is known and gameplay ends. For example, in roulette the outcome mode is entered when the ball lands on a number, and in Baccarat the outcome mode is entered when either the banker wins, the player wins, or a tie occurs. In systems that feature manual transitions, the dealer may indicate the entry of outcome mode, for example by using a touchscreen to touch the resulting number (in roulette) or touching buttons corresponding to banker win, player win or tie (in Baccarat). In systems that feature automatic transitions, the system may (in Baccarat) watch cards as they are removed from the shoe, and may keep a count for the banker hand and the player hand, and thus can determine the result (banker win, player win or tie).

Once outcome mode has ended, the system enters collection mode. In collection mode, the dealer collects the losing bets. It is possible to automate the transition from outcome mode to collection mode. In the cases where the computer also knows (by independent means) the outcome of the game (winning versus losing bets) and the odds associated with each bet, the system may calculate the correct payouts and help to ensure proper collection and disbursement. Furthermore, the system can—over a series of games—help ensure that the net (winners minus losers) converge to the statistical norms. In the case where the system knows the locations of the bets and the result of the gameplay, the system thus knows which bets lost and must be collected.

Once collection mode has ended, the system enters payout mode. In payout mode, the dealer pays out the winning bets. The system knows the locations of the winning bets to be paid out. The dealer may manually indicate the transition from collection mode to payout mode after the losing bets have been collected, for example by using the touchscreen, or the system may transition automatically (e.g., by detecting that all losing bets have been removed).

The system may have other modes, such as a postgame mode after payouts have been made but before new bets are being accepted for the next game, etc. The transitions between modes can be manual or automatic depending on the information available to the computer.

The system may verify the accuracy of the dealer's collections and payouts at various points. When the system transitions from collection mode to payout mode, the system may verify that all losing bets have been collected. In payout mode, players are allowed to remove their winnings at any time. For this reason, it is desirable to track each winning bet independently. To accomplish this, the system associates each payout to its respective winning bet. Dealers are taught specific "rules" to systematize this process and make it easy for security personnel to monitor activities. In particular, payouts are placed proximally to their respective bets. To exploit RFID tracking to its maximum potential, the system helps to monitor the location of each payout relative to its winning bet.

For example, it is desirable during payout mode to correctly associate specific payouts with specific winning bets. The first step is to accurately locate the bets in order to segregate winners from losers. Then, after odds are taken into account, the system is able to track in real-time that payouts are individually tied to each winning bet.

As an example for Baccarat (see FIG. 1), the system knows the result (e.g., the banker wins), so the bets for the banker to win are to be paid out and the bets for the player to win or the bets to tie are to be picked up. The losing bets are located at the tie spots (140a-140b) and the player betting spots (120a-120l). Once the gameplay is over (resulting in the banker winning), the system transitions (manually or automatically) to collection mode, and tracks the dealer as he collects the losing bets at 120a-120l and 140a-140b. The system then transitions (manually or automatically) to payout mode, and the system reads the spots 120a-120l and 140a-140b to verify that all losing bets have been collected The dealer then pays the winning bets at the banker betting spots 130a-130l. (Bets on the banker pay 19 to 20.) The system then transitions (manually or automatically) to postgame mode, and the system reads the spots 130a-130l to verify that each payout is correct. For example, if there are bets of $500 and $1000 at 130a (which the system has detected earlier), the dealer pays out $475 and $950. The system then reads spot 130a and the result is four bets of $500, $475, $1000 and $950; the system is aware of the 19-to-20 payout rule and thus is able to verify that these are the correct amounts. The system also detects that the $475 payout is proximate to the $500 bet and that the $950 payout is proximate to the $1000 bet.

As an example for roulette (see FIG. 2), the system knows the winning number (e.g., "1") and, being programmed with the rules of the game, may determine the ancillary winning bets such as red/black, street, etc. The losing bets are located at the spots that do not include "1", such as the other numbered spots, the "black" bet, the "even" bet, the streets that do not include "1", etc. Once the gameplay is over (resulting in the "1" number), the system transitions to collection mode, and the dealer collects the losing bets at the losing locations. The system then transitions to payout mode and verifies that no tokens are detected at the losing locations (and thus have all been collected). The dealer then pays the winning bets: straight bets (bets within the spot 220a), split bets (bets on the lines between the spot 220a and adjacent spots for the numbers "2" and "4"), street bets (bets on the line between the spot 220a and the "1st 12" area), corner bets (bets on the corner of the spot 220a and the numbers "2", "4" and "5"), etc. The system then transitions to postgame mode and reads the array to verify that the payouts are correct in the winning areas. For example, if there are bets of $1 and $5 as straight bets in the spot 220a and a bet of $5 on "red" (which the system has detected earlier), the dealer pays out $35, $175 and $5. The system then reads the array and detects six stacks of $1, $35, $5, $175, $5 and $5; the system is aware of the payout rules and thus is able to verify that these are the correct amounts, and that each payout is located proximate to its corresponding winning bet (exploiting the ability to locate the payouts relative to the location of the original winning bets).

Additional Embodiments

Figure 15:
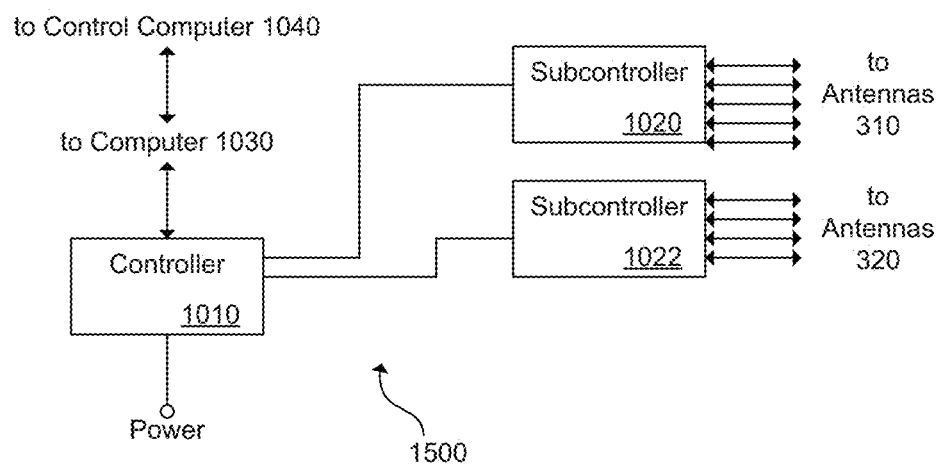
FIG. 15 is a diagram showing a system and antenna array where the antennas are overlapping and oriented in a single direction.
Figure 15:
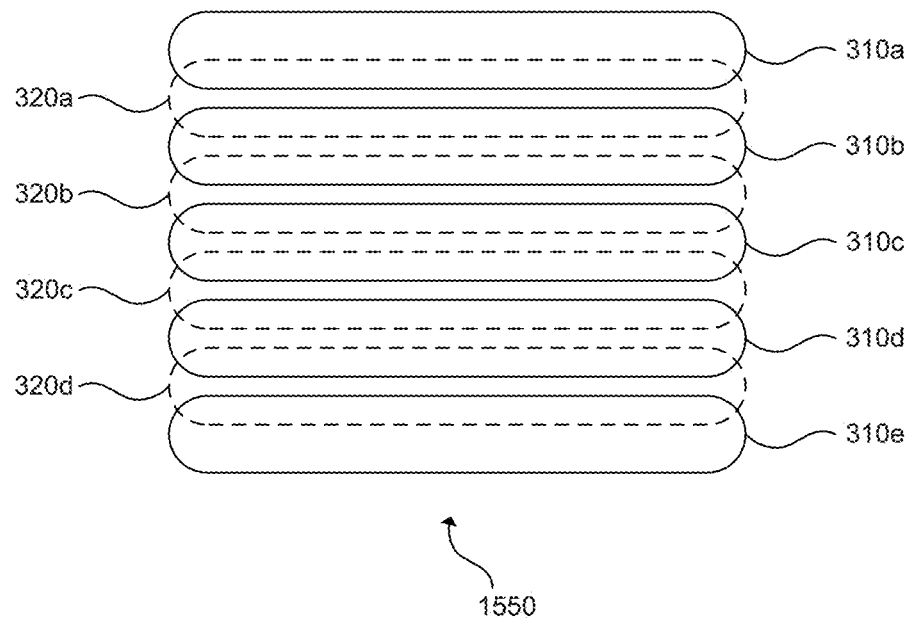

FIG. 15 is a diagram showing a system 1500 and antenna array 1550 where the antennas are overlapping and oriented in a single direction. The system 1500 is similar to the system 1000 (see FIG. 10, with similar reference numerals) but having only two subcontrollers 1020 and 1022. The antenna array 1550 is similar to the array 300 (see FIG. 3, with similar reference numbers).

The operation of the system 1500 and antenna array 1550 is generally similar to the system 1000 and array 300 (or the method 1100 of FIG. 11) as described above, with the system 1500 implementing interpolation (as described above) to determine the location of a RFID gaming token. More specifically, the controller 1010 controls the subcontroller 1020 to selectively energize the subset 310, and controls the subcontroller 1022 to selectively energize the subset 320 (see FIG. 3). The controller 1010 receives (via the subcontroller 1020) a first signal strength resulting from reading the RFID gaming token in the betting area according to the first subset being selectively energized, and receives (via the subcontroller 1022) a second signal strength resulting from reading the RFID gaming token in the betting area according to the second subset being selectively energized. The system 1500 determines the location of the RFID gaming token in the betting area by interpolating between the first signal strength and the second signal strength. The controller 1010 may perform the interpolation, or the computer 1030 may perform the interpolation.

Figure 16:
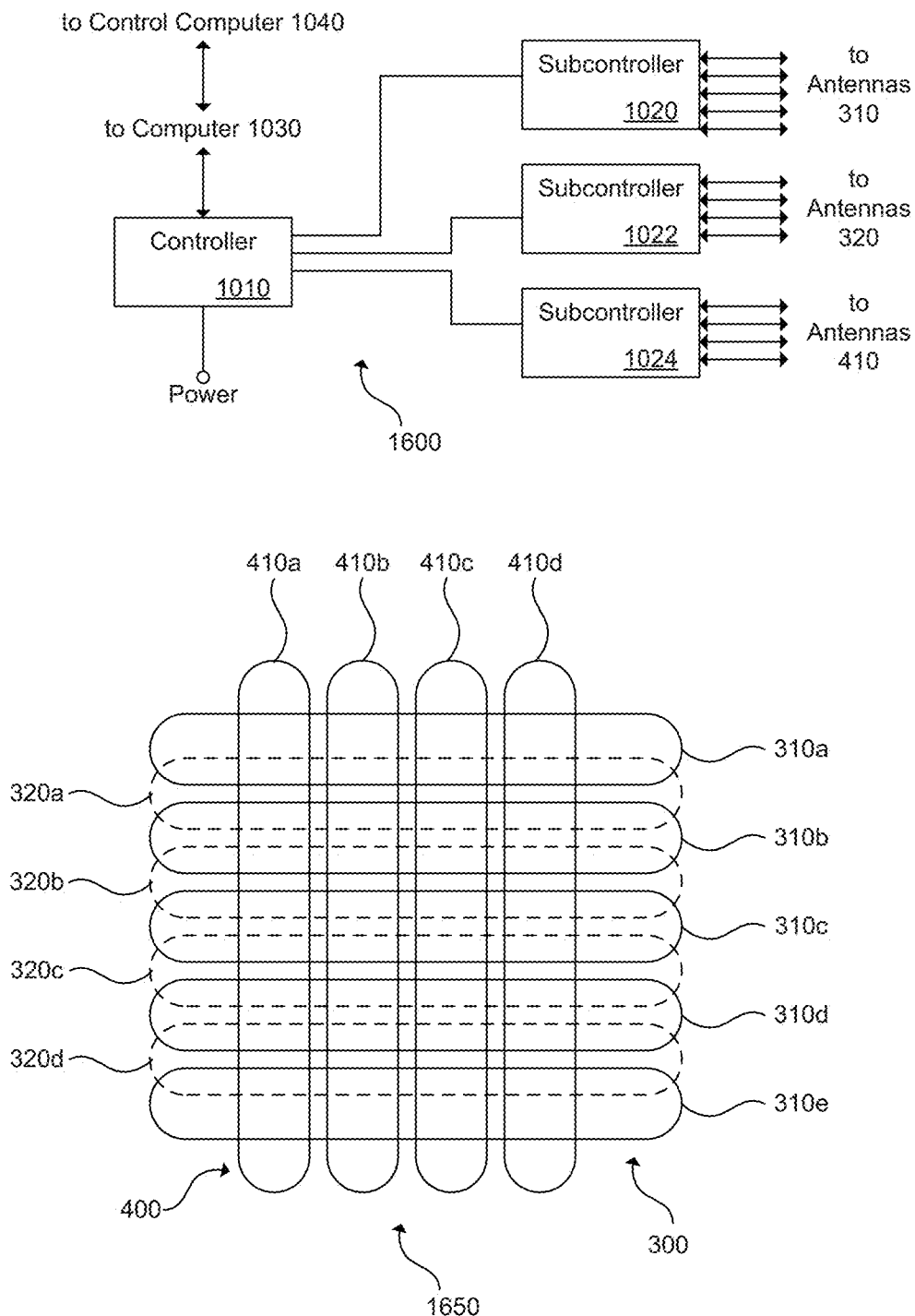
FIG. 16 is a diagram showing a system and antenna array where the antennas in one direction are overlapping, and the antennas in another direction are not overlapping.

FIG. 16 is a diagram showing a system 1600 and antenna array 1650 where the antennas in one direction are overlapping, and the antennas in another direction are not overlapping. The system 1600 is similar to the system 1000 (see FIG. 10, with similar reference numerals) but having only three subcontrollers 1020, 1022 and 1024. The antenna array 1650 is similar to the array 700 (see FIG. 7, with similar reference numbers) without the overlapping subset 420 (see FIG. 4).

The operation of the system 1600 and antenna array 1650 is generally similar to the system 1000 and array 700 (or the method 1100 of FIG. 11) as described above, with the location determination being more precise in the y-axis direction than it is in the x-axis direction, due to the overlapping antennas 300 in the y-axis direction. More specifically, the controller 1010 controls the subcontroller 1020 to selectively energize the subset 310, controls the subcontroller 1022 to selectively energize the subset 320 (see FIG. 3), and controls the subcontroller 1024 to selectively energize the subset 410 (see FIG. 4). The controller 1010 receives (via the subcontrollers 1020 and 1022) a first plurality of signal strengths resulting from reading the RFID gaming token in the betting area according to the first set being selectively energized, and receives (via the subcontroller 1024) a second plurality of signal strengths resulting from reading the RFID gaming token in the betting area according to the second set being selectively energized. The system 1600 determines the location of the RFID gaming token in the betting area by comparing the first plurality of signal strengths and the second plurality of signal strengths, in a manner similar to that described above.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for locating gaming tokens on a gaming table, comprising:
    a first set of antennas oriented in a first direction, wherein the first set of antennas defines a betting area of the gaming table, and wherein the first set includes a first subset of antennas and a second subset of antennas, wherein the first subset and the second subset are overlapping;
    a second set of antennas oriented in a second direction that differs from the first direction, wherein the first set and the second set are overlapping, wherein the second set includes a third subset of antennas and a fourth subset of antennas, wherein the third subset and the fourth subset are overlapping; and
    a control circuit, coupled to the first and second sets, that is configured to selectively energize the first and second sets, that is configured to receive a first plurality of signal strengths resulting from reading a radio frequency identification (RFID) gaming token in the betting area according to the first set being selectively energized, that is configured to receive a second plurality of signal strengths resulting from reading the RFID gaming token in the betting area according to the second set being selectively energized, and that is configured to determine a location of the RFID gaming token in the betting area by comparing the first plurality of signal strengths and the second plurality of signal strengths.

2. The system of claim 1, wherein the first plurality of signal strengths includes at least one zero signal strength indicating that a corresponding antenna of the first set failed to read the RFID gaming token.

3. The system of claim 1, wherein the control circuit is configured to determine the location of the RFID gaming token in the betting area by being configured to determine a first antenna as being a closest antenna from the first set for reading the RFID gaming token in the betting area according to a highest signal strength from the first plurality of signal strengths, by being configured to determine a second antenna as being the closest antenna from the second set for reading the RFID gaming token in the betting area according to the highest signal strength from the second plurality of signal strengths, and by being configured to determine the location of the RFID gaming token in the betting area according to an intersection of the first antenna and the second antenna.

4. The system of claim 1, wherein the RFID gaming token is one of a plurality of RFID gaming tokens, and wherein the control circuit is configured to determine a location of each of the plurality of RFID gaming tokens in the betting area by comparing, for each of the plurality of RFID gaming tokens, the first plurality of signal strengths and the second plurality of signal strengths.

5. The system of claim 1, wherein the RFID gaming token is one of a plurality of RFID gaming tokens, and wherein the control circuit is configured to determine a plurality of locations for the plurality of RFID gaming tokens in the betting area by comparing, for each of the plurality of RFID gaming tokens, the first plurality of signal strengths and the second plurality of signal strengths.

6. The system of claim 1, wherein the RFID gaming token is one of a plurality of RFID gaming tokens in a stack, and wherein the control circuit is configured to determine a location of the stack in the betting area by comparing, for each of the plurality of RFID gaming tokens, the first plurality of signal strengths and the second plurality of signal strengths.

7. The system of claim 1, wherein the RFID gaming token is one of a plurality of RFID gaming tokens in a plurality of stacks, and wherein the control circuit is configured to determine a location of each of the plurality of stacks in the betting area by comparing, for each of the plurality of RFID gaming tokens, the first plurality of signal strengths and the second plurality of signal strengths.

8. The system of claim 1, wherein the RFID gaming token is one of a plurality of RFID gaming tokens in a plurality of stacks, and wherein the control circuit is configured to determine a plurality of locations of the plurality of stacks in the betting area by comparing, for each of the plurality of RFID gaming tokens, the first plurality of signal strengths and the second plurality of signal strengths.

9. The system of claim 1, wherein the betting area comprises a first betting area, wherein the RFID gaming token comprises a first RFID gaming token, further comprising:
    a third set of overlapping antennas, coupled to the control circuit, wherein the third set defines a second betting area adjacent to the first betting area,
    wherein the control circuit is configured to determine a location of a second RFID gaming token in the second betting area, wherein the control circuit is configured to fail to read the first RFID gaming token in the second betting area, and wherein the control circuit is configured to fail to read the second RFID gaming token in the first betting area.

10. The system of claim 1, wherein the control circuit is configured to determine the location of the RFID gaming token in the betting area by interpolating among the first plurality of signal strengths and interpolating among the second plurality of signal strengths.

11. The system of claim 1, wherein the control circuit is configured to selectively energize the first set in a sequential manner.

12. The system of claim 1, wherein the control circuit is configured to selectively energize more than one of the first and second sets at a given time.

13. The system of claim 1, wherein the first subset and the second subset are overlapping such that the first set collectively has no dead spot.

14. The system of claim 1, wherein the first plurality of signal strengths corresponds to a signal strength that is above a threshold and at least one signal strength that is below the threshold.

15. A method of locating gaming tokens on a gaming table, comprising:
   providing a first set of antennas oriented in a first direction, wherein the first set of antennas defines a betting area of the gaming table, and wherein the first set includes a first subset of antennas and a second subset of antennas, wherein the first subset and the second subset are overlapping;
   providing a second set of antennas oriented in a second direction that differs from the first direction, wherein the first set and the second set are overlapping, wherein the second set includes a third subset of antennas and a fourth subset of antennas, wherein the third subset and the fourth subset are overlapping;
   selectively energizing the first and second sets;
   receiving a first plurality of signal strengths resulting from reading a radio frequency identification (RFID) gaming token in the betting area according to the first set being selectively energized;
   receiving a second plurality of signal strengths resulting from reading the RFID gaming token in the betting area according to the second set being selectively energized; and
   determining a location of the RFID gaming token in the betting area by comparing the first plurality of signal strengths and the second plurality of signal strengths.

16. A system for locating gaming tokens on a gaming table, comprising:
   a first set of antennas oriented in a first direction, wherein the first set of antennas defines a betting area of the gaming table, and wherein the first set includes a first subset of antennas and a second subset of antennas, wherein the first subset and the second subset are overlapping; and
   a control circuit, coupled to the first set, that is configured to selectively energize the first and second subsets, that is configured to receive a first signal strength resulting from reading a radio frequency identification (RFID) gaming token in the betting area according to the first subset being selectively energized, that is configured to receive a second signal strength resulting from reading the RFID gaming token in the betting area according to the second subset being selectively energized, and that is configured to determine a location of the RFID gaming token in the betting area by interpolating between the first signal strength and the second signal strength.

17. A method of locating gaming tokens on a gaming table, comprising:
   providing a first set of antennas oriented in a first direction, wherein the first set of antennas defines a betting area of the gaming table, and wherein the first set includes a first subset of antennas and a second subset of antennas, wherein the first subset and the second subset are overlapping;
   selectively energizing the first and second subsets;
   receiving a first signal strength resulting from reading a radio frequency identification (RFID) gaming token in the betting area according to the first subset being selectively energized;
   receiving a second signal strength resulting from reading the RFID gaming token in the betting area according to the second subset being selectively energized; and
   determining a location of the RFID gaming token in the betting area by interpolating between the first signal strength and the second signal strength.

18. A system for locating gaming tokens on a gaming table, comprising:
   a first set of antennas oriented in a first direction, wherein the first set of antennas defines a betting area of the gaming table, and wherein the first set includes a first subset of antennas and a second subset of antennas, wherein the first subset and the second subset are overlapping;
   a second set of antennas oriented in a second direction that differs from the first direction, wherein the first set and the second set are overlapping; and
   a control circuit, coupled to the first and second sets, that is configured to selectively energize the first and second sets, that is configured to receive a first plurality of signal strengths resulting from reading a radio frequency identification (RFID) gaming token in the betting area according to the first set being selectively energized, that is configured to receive a second plurality of signal strengths resulting from reading the RFID gaming token in the betting area according to the second set being selectively energized, and that is configured to determine a location of the RFID gaming token in the betting area by comparing the first plurality of signal strengths and the second plurality of signal strengths.

19. A method of locating gaming tokens on a gaming table, comprising:
   providing a first set of antennas oriented in a first direction, wherein the first set of antennas defines a betting area of the gaming table, and wherein the first set includes a first subset of antennas and a second subset of antennas, wherein the first subset and the second subset are overlapping;
   providing a second set of antennas oriented in a second direction that differs from the first direction, wherein the first set and the second set are overlapping;
   selectively energizing the first and second sets;
   receiving a first plurality of signal strengths resulting from reading a radio frequency identification (RFID) gaming token in the betting area according to the first set being selectively energized;
   receiving a second plurality of signal strengths resulting from reading the RFID gaming token in the betting area according to the second set being selectively energized; and determining a location of the RFID gaming token in the betting area by comparing the first plurality of signal strengths and the second plurality of signal strengths.

\* \* \* \* \*